United States Patent
Li

(10) Patent No.: US 6,636,832 B1
(45) Date of Patent: Oct. 21, 2003

(54) METHOD AND SYSTEM FOR DECODING A COMPRESSED DATA FILE

(75) Inventor: Hsiao Yi Li, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/464,062

(22) Filed: Dec. 15, 1999

Related U.S. Application Data

(60) Provisional application No. 60/115,567, filed on Jan. 12, 1999.

(51) Int. Cl.[7] ............................................... G10L 19/00
(52) U.S. Cl. ....................... 704/500; 704/503; 370/513; 375/366
(58) Field of Search ................................ 704/500, 503; 370/503, 509, 510, 512, 513, 514; 375/354, 362, 365

(56) References Cited

U.S. PATENT DOCUMENTS 6,421,646 B1 * 7/2002 Li .............................. 704/500
6,421,647 B1 * 7/2002 Li .............................. 704/500

* cited by examiner

*Primary Examiner*—Susan McFadden
(74) *Attorney, Agent, or Firm*—Robert D. Marshall, Jr.; W. James Brady, III; Frederick J. Telecky, Jr.

(57) ABSTRACT

A data file having a plurality of frames is received, with each frame having a syncword located at a first predefined length from a known data value that is inconsistent with a data pattern of the syncword. A data string including a plurality of potential syncwords is identified. A first portion of the data string in excess of a second predefined length is skipped from syncword verification processing. The second predefined length includes the first predefined length plus the length of the syncword. A second remaining portion of the data string is processed for syncword verification.

20 Claims, 4 Drawing Sheets

METHOD AND SYSTEM FOR DECODING A COMPRESSED DATA FILE

RELATED APPLICATIONS

This application is related to a provisional application Ser. No. 60/115,567 having a title of "Probabilistic Method and System for Verifying Synchronization Words," filed Jan. 12, 1999. This application is also related to a co-pending provisional application Ser. No. 60,115,569 having a title of "Deterministic Method and System for Verifying Synchronization Words," filed Jan. 12, 1999.

TECHNICAL FIELD OF THE INVENTION

This invention relates generally to data compression and more particularly to a method and system for decoding a compressed data file.

BACKGROUND OF THE INVENTION

Some sounds cannot be perceived as accurately by the human ear as other sounds, and some sounds cannot be perceived by the human ear at all. Therefore, a digital representation of an audio signal may be compressed by taking advantage of these properties of the human ear and allocating more bits of data to represent the sounds that a human ear can more readily perceive and less bits of data to represent the sounds that a human ear can less readily perceive. A standard digital audio encoded signal format has been set forth by the Motion Picture Experts Group for this type of compression. This format is commonly referred to as "MPEG Audio."

In a typical compression, the data is divided by an encoder into a number of segments called frames. The encoder also adds overhead data to the beginning of each frame that provides information about the audio data in that frame, such as identification, layer, protection, bit rate, etc. The overhead data generally begins with a synchronization word (syncword) as a signal to a decoder that a new frame is beginning. The decoder searches for a syncword from which to begin decoding during the initial decoding process, or when recovering from an error or switching channels.

Conventional techniques used to find and verify the validity of possible syncwords generally rely on an extended buffer to store a large section of a data stream. This stored section of the data stream is searched for possible syncwords and used to verify the validity of those possible syncwords. This reliance on an extended buffer is a problem because extended buffers are more costly and on-chip memories in general are relatively small. In addition, when the stored section includes a long string of possible syncwords, processing to verify all of the possible syncwords prolongs recovery time and may cause buffer overflow.

SUMMARY OF THE INVENTION

In accordance with the present invention, a method and system for decoding a compressed data file are provided that substantially eliminate or reduce disadvantages and problems associated with previously developed systems and methods. In particular, the present invention uses a known data value that is fixed in relation to valid synchronization words (syncwords) to identify and eliminate many false syncwords from verification processing.

In one embodiment of the present invention, a data file having a plurality of frames is received. Each frame has a syncword located at a first predefined length from a known data value that is inconsistent with a data pattern of the syncword. A data string including a plurality of potential syncwords is identified in the data file. A first portion of the data string in excess of a second predefined length is skipped from syncword verification processing. The second predefined length includes the first predefined length plus the length of the syncword. A second remaining portion of the data string is processed for syncword verification.

Technical advantages of the present invention include providing an improved method and system for decoding a compressed data file. In particular, many false syncwords are identified and eliminated from verification processing using a known data value that is fixed in relation to a valid syncword. Accordingly, verification processing of false syncwords that may prolong recovery or render recovery impossible when decoding a compressed data file is reduced.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
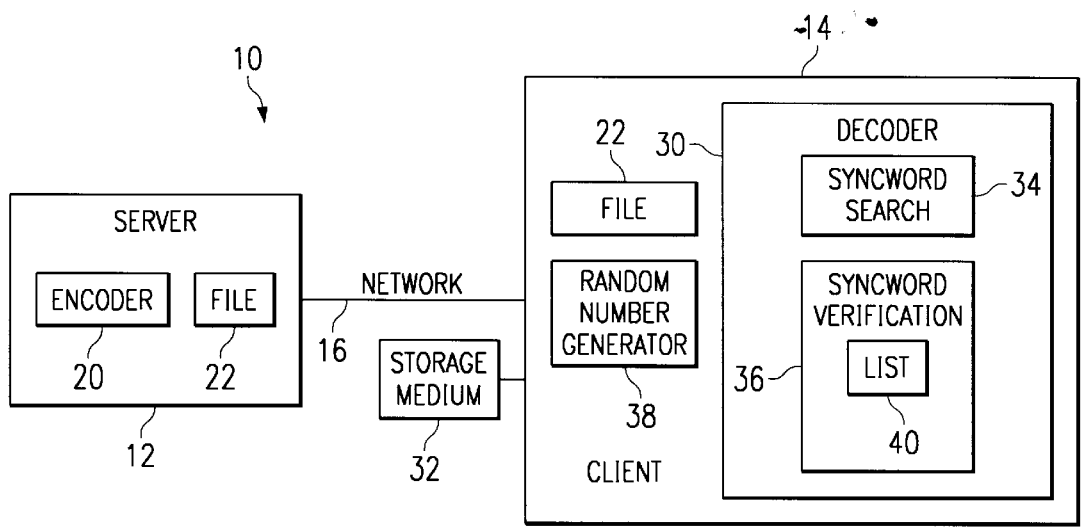
FIG. 1 is a block diagram illustrating a network system of encoding and decoding data in accordance with one embodiment of the present invention.

The preferred embodiments of the present invention and its advantages are best understood by referring now in more detail to FIGS. 1–5 of the drawings, in which like numerals refer to like parts. FIG. 1 is a block diagram illustrating a network system 10 for encoding and decoding compressed data in accordance with one embodiment of the present invention. Network system 10 includes a server 12, a client 14, and a network 16.

Server 12 comprises a data encoder 20 and a data file 22 that has been compressed by encoder 20. Server 12 may be a computer such as a personal computer, file server, workstation, mini-computer, mainframe or any general purpose or other computer capable of compressing data. Generally described, server 12 includes an input/output system, processor, and memory. The input/output system connects the network 16 and other input and output devices to server 12. The network 16 may be directly connected to server 12 or may be connected through a data transmission device, such as a modem or the like. The input devices may include a pointing device, such as a mouse or track pad, a keyboard, or the like. The output devices may include a monitor, a printer, or the like.

Encoder 20 compresses a digital representation of an audio signal. In one embodiment, the encoder 20 is an MPEG encoder that compresses an audio signal by removing data that corresponds to sounds that cannot be perceived by the human ear. In addition to removing such data, encoder 20 divides the data into a number of segments, or frames, and adds overhead data to the beginning of each frame that allows the audio data to be decoded. This overhead data at the beginning of each frame includes a header that may provide information such as identification, layer, protection, or bit rate, of the frame. The overhead data generally begins with a synchronization word (syncword) that signals the beginning of a new frame of data. Thus, the compressed data file 22 includes a plurality of frames that each include a syncword, additional decoding data, and compressed audio data. As used herein, each means each of at least a subset of the identified items. Encoder 20 may also add ancillary data to fill any excess space between the end of the audio data in one frame and the syncword of the next frame.

Client 14 comprises a data decoder 30 and a copy of the compressed data file 22. Client 14 is similar to server 12 and may be implemented using virtually any type of computer. For example, client 14 may be a personal computer having an input/output system, a processor, and a memory. Alternatively, client 14 may be a CD player, DVD player, or any other device capable of decoding compressed data. In this embodiment, the compressed file 22 may reside on a transportable storage medium 32, such as a compact disc, video digital disk, or the like.

Decoder 30 decompresses the compressed data file 22 to restore the data signal that was compressed. For the MPEG embodiment, the data signal generates sounds that closely approximate the original audio signal. During the initial decoding process, or when recovering from an error or switching channels, decoder 30 identifies a valid syncword that indicates the beginning of a frame and thus decodes the compressed data file 22 based on the valid syncword. Decoding is based on a syncword when the syncword is used to indicate the beginning of a frame or to identify another syncword that indicates the beginning of a frame.

In identifying syncwords, the decoder 30 often encounters data that matches the syncword but that does not correspond to the beginning of a frame. For example, the compressed audio data within a frame may include data that matches the syncword. Because this data is not at the beginning of a frame and is not meant to be a syncword, this data is called a false syncword. If decoder 30 attempts to decode the data based on a false syncword, the result can be prolonged interruption in the playback of a compressed audio stream and, in some situations, recovery can be rendered impossible. The reason for these problems is that decoder 30 uses the data following the syncword, called the header, to decode the audio data in that particular frame. Therefore, if decoder 30 attempts to decode from a false syncword, the data following that false syncword will not correspond to valid header data, and decoder 30 will be unable to process the audio data properly. To avoid these problems, decoder 30 may analyze a potential syncword to determine whether it is a valid syncword or a false syncword before attempting to process the data based on the potential syncword.

Decoder 30 includes syncword search engine 34 and syncword verification engine 36 to identify valid syncwords. Generally described, syncword search engine 34 searches a compressed data file 22 for potential syncwords that may indicate the beginning of a valid frame. Syncword verification engine 36 is used to verify the validity of the potential syncwords.

In accordance with one aspect of the present invention, syncword search engine 34 uses a known data value that is fixed in relation to a valid syncword and inconsistent with the syncword to identify and eliminate certain false syncwords from verification processing. Accordingly, the number of false syncwords that decoder 30 must process for verification is reduced. This minimizes or eliminates the problems associated with decoder 30 attempting to process a large number of false syncwords, such as recovery being prolonged or rendered impossible.

In accordance with another aspect of the present invention, the syncword verification engine 36 efficiently verifies potential syncwords using only a small buffer. Accordingly, reliance on more costly, extended buffers is avoided and relatively small buffers, such as those provided by on-chip memories, may be used instead.

In one embodiment, syncword verification engine 36 selects one of the remaining potential syncwords randomly, according to a statistical distribution, or by any other suitable method. In the case that one of the remaining potential syncwords is selected at random, a random number generator 38 may generate a random number to use as a basis for the selection. Once a potential syncword has been selected, syncword verification engine 36 decodes the header following that potential syncword. Based on the header, syncword verification engine 36 identifies the address of a subsequent potential syncword. Syncword verification engine 36 then determines whether or not a syncword exists at the identified address. If such a syncword does exist, that syncword is determined to be valid and is used to decode the compressed data file 22. In this embodiment, only the identified address needs to be buffered. All data in the data file 22 prior to the identified address can be skipped over and does not need to be buffered.

In another embodiment, syncword verification engine 36 includes a list 40 of subsequent potential syncword addresses. This list 40 is generated by decoding the header associated with each potential syncword received from the syncword search engine 34 to find its associated subsequent potential syncword. A next potential syncword is then repeatedly identified, and its associated pointer address is compared to the subsequent potential syncword addresses in the list 40 until a match is found. If the pointer address matches an address in the list 40, the next potential syncword is determined to be valid and used to decode the compressed data file 22. Syncword verification engine 36 continually updates the list 40 during verification by removing any addresses which have already been passed and adding the subsequent potential syncword address associated with the next potential syncword. Accordingly, syncwords are verified by storing only the list 40 of addresses in the buffer. All data in the data file 22 prior to each identified next potential syncword can be skipped over and does not need to be buffered.

Network 16 comprises one or more communication lines. The communication lines may be any type of communication link capable of supporting data transfer. The communication lines may comprise, alone or in combination, Integrated Services Digital Network (ISDN), Asymmetric Digital Subscriber Line (ADSL), T1 or T3 communication lines, hard-wire lines, or telephone links. The communication lines may also connect to a plurality of intermediate servers between server 12 and client 14. Moreover, network 16 may be any interconnection found on any computer network such as a local area network (LAN), a wide area network (WAN), the Internet, or any other communications and data exchange systems created by connecting two or more computers.

Figure 2:
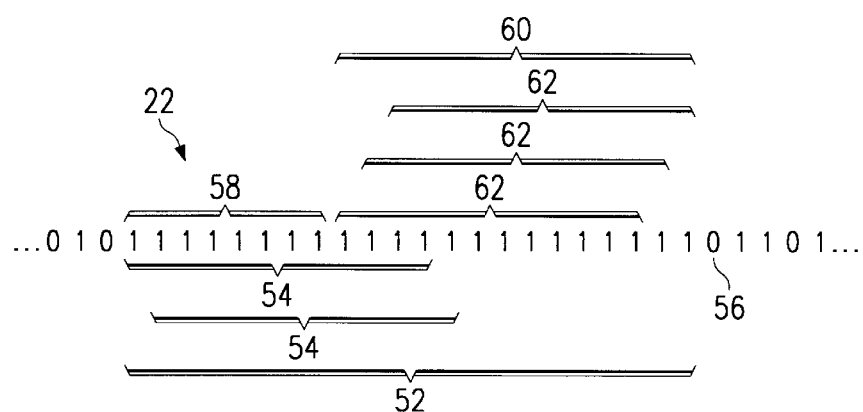
FIG. 2 is a block diagram illustrating details of the compressed data file of FIG. 1.

FIG. 2 is a block diagram illustrating details of the compressed data file 22 in accordance with one embodiment of the present invention. For the embodiment illustrated in FIG. 2, the data file 22 has been compressed using the MPEG-1 or MPEG-2 standard for compressing audio data. In this embodiment, the syncword is a series of twelve consecutive ones (1s). Within the data file 22, there is a data string 52 that includes a plurality of potential syncwords 54. As shown in FIG. 2, a data string 52 with more than twelve consecutive ones (1s) will include more than one potential syncword 54. This data string 52 is ended by a data bit 56 that is inconsistent with the data pattern of the syncword. For the MPEG embodiment, the data bit 56 is a zero (0). Because a zero (0) is inconsistent with the syncword pattern of the MPEG embodiment, the presence of a zero (0) necessarily ends the data string 52 of potential syncwords 54.

Each frame in the compressed data file 22 includes a known data value located at a first predefined length from the syncword. The known data value may include one or more data bits and is known in that what the value can or cannot be is predefined. The known data value is inconsistent with the pattern of the syncword and that inconsistency provides the data bit 56 used to signify the end of the data string 52. The first predefined length is the intervening distance between the known data value and a valid syncword. A second predefined length is determined by adding the length of the syncword to the first predefined length and the length of the known data value minus one bit. This second predefined length, therefore, is the maximum possible length of a data string 52 that begins with a valid syncword.

For the MPEG embodiment, the first predefined length is four bits in the MPEG header that follows the syncword. These are one bit for identification, two bits for layer, and one bit for protection. The known data value is the next four bits that represent bit rate. The bit rate for MPEG-1 and MPEG-2 audio cannot be all ones (1s). Therefore, a valid syncword may be followed by a maximum of seven ones (1s) (one for identification, two for layer, one for protection, and three for bit rate). Thus, the second predefined length is nineteen bits for the MPEG embodiment, the length of the syncword (twelve bits) and the first predefined length (four bits) plus the length of the known data value minus one bit (three bits). This second predefined length is used to identify and eliminate false syncwords in the data string 52 from verification processing. Thus, if syncword search engine 34 encountered thirty consecutive ones (1s), for example, the first eleven ones (1s) could not possibly correspond to the beginning of a valid syncword because the bit rate data associated with these potential syncwords 54 would consist of all ones (1s), which constitutes an invalid bit rate. Thus, any number of ones (1s) in excess of nineteen may be skipped by decoder 30 when attempting to verify syncwords, as described in more detail below.

In addition, many MPEG-compressed audio data files 22 have a layer value of two (10 in binary) in the header. Thus, the first predefined length is two bits, the identification bit and the first layer bit. The known data value, which in this case is the same as the data bit 56, is the zero (0) in the second bit of the layer information. Thus, for layer-two data files 22, a valid syncword is followed by a maximum of two ones (1s) (one for identification and one for layer). Because the known data value in this case is only one bit, its length minus one bit leaves nothing to add into the second predefined length. Therefore, the second predefined length is fourteen bits, the length of the syncword plus the first predefined length. FIG. 2 shows a layer-two data file 22 in which the data bit 56 is separated from a valid syncword by a maximum of two ones (1s).

Referring to FIG. 2, there are more than two ones (1s) between the first potential syncword 54 at the beginning of the data string 52 and the data bit 56 that is inconsistent with the data pattern of the syncword.

Because of this, the header associated with the first potential syncword 54 begins with at least three ones (1s), corresponding to an identification value of 1 and a layer value of 11. Thus, the first potential syncword 54 in the data string 52 must be a false syncword if the data file 22 is a layer-two MPEG file 22 because the actual layer value is 10, not 11. Similarly, any potential syncword 54 in the data string 52 that has more than two ones (1s) separating that potential syncword 54 from the data bit 56 must be a false syncword. Thus, if syncword search engine 34 encountered thirty consecutive ones (1s), for example, the first sixteen ones (1s) could not possibly correspond to the beginning of a valid syncword because the layer data associated with these potential syncwords 54 would be 11, instead of 10. Thus, any number of ones (1s) in excess of fourteen may be skipped by decoder 30 when attempting to verify syncwords.

Therefore, the second predefined length, that corresponds to a maximum length for a data string 52 that begins with a valid syncword, may be determined by adding the first predefined length to the length of the syncword and, if the known data value is more then one bit, adding its length minus one bit. Thus, using the information regarding the known data value, a first portion 58 of the data string 52. may be skipped, leaving only a second remaining portion 60 of the data string 52 to be processed for syncword verification. For the general MPEG embodiment, the second remaining portion 60 is nineteen bits long, and for the layer-two MPEG embodiment, the second remaining portion 60 is fourteen bits long. As previously described, any potential syncword 54 at the beginning of a longer data string 52 would be a false syncword.

Therefore, a number of potential syncwords 54 have been eliminated as false syncwords and decoder 30 is left with a reduced number of potential syncwords 54 to analyze for validity. Using this method for the MPEG embodiment, decoder 30 never needs to analyze more than eight potential syncwords 54 from any string of potential syncwords 54. This is because, with a maximum of nineteen consecutive ones (1s), only the first eight ones (1s) are followed by at least eleven more consecutive ones (1s). Thus, there are only eight remaining potential syncwords 62 after the first portion 58 of the data string 52 is skipped. For the layer-two MPEG embodiment illustrated in FIG. 2, there are only three remaining potential syncwords 62 based on the maximum of fourteen consecutive ones (1s). Therefore, decoder 30 never needs to analyze more than three potential syncwords 54 from any string of potential syncwords 54 in this embodiment.

Although the present invention is described in connection with an audio data file 22, it should be understood that the present invention may be used in connection with any data file 22 that includes a plurality of frames, each beginning with a syncword that is located at a first predefined length from a known data value that is inconsistent with a pattern of the syncword.

Figure 3:
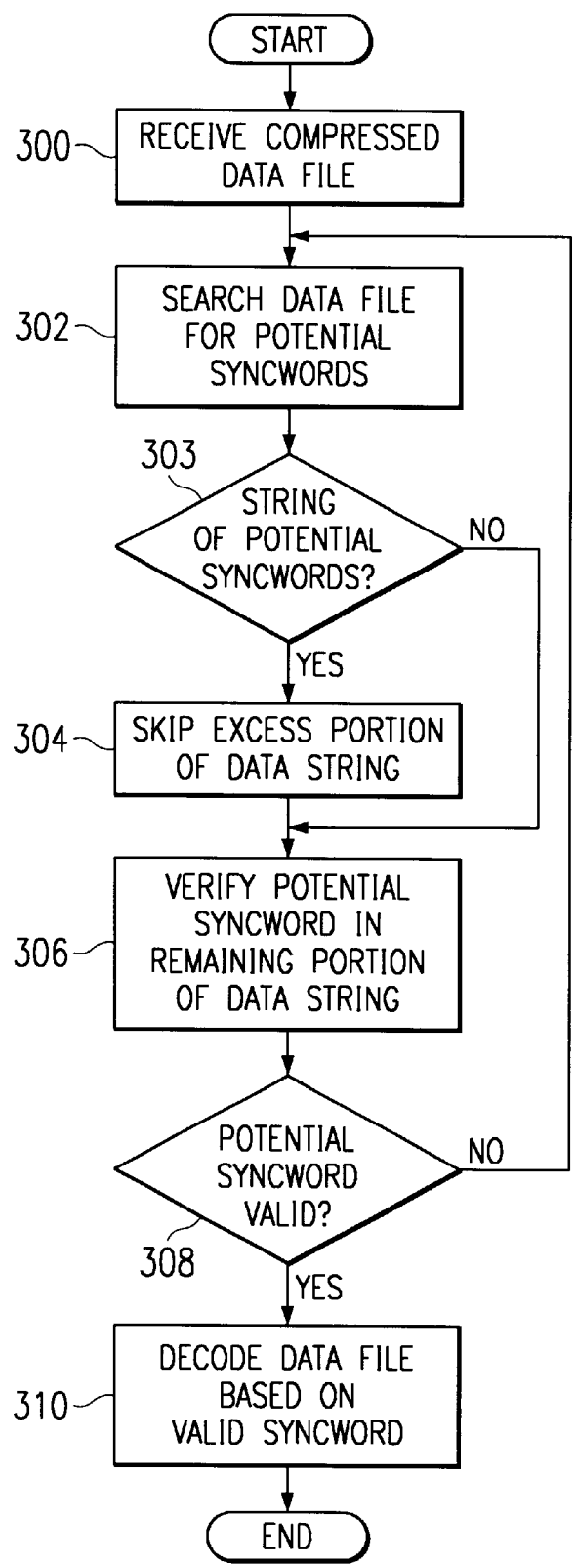
FIG. 3 is a flow diagram illustrating a computer method for decoding a compressed data file in accordance with one embodiment of the present invention.

FIG. 3 is a flowchart illustrating a method for decoding a compressed data file 22. The method begins at step 300 in which decoder 30 receives a compressed data file 22. As described above, this data file 22 may be received through network 16 or from a storage medium 32 such as a compact disc. Next, at step 302, syncword search engine 34 begins searching the data file 22 for potential syncwords 54.

Proceeding to decisional step 303, if a data string 52 is found that includes a plurality of potential syncwords 54, the Yes branch of decisional step 303 leads to step 304. At step 304, syncword search engine 34 skips a first portion 58 of the data string 52 that corresponds to a set of known false syncwords. As described in more detail above in connection with FIG. 2, the size of this first portion 58 is determined by using information regarding a known data value that is located at a first predefined length from a valid syncword and that is inconsistent with the pattern of the syncword. Step 304 and the No branch of decisional step 303 each lead to step 306.

At step 306, decoder 30 attempts to verify one or more of the remaining potential syncwords 62. Step 306 may be accomplished using any conventional technique for verifying syncwords or as described below in connection with FIGS. 4 and 5. At decisional step 308, decoder 30 determines whether any of the remaining potential syncwords 62 are valid. If no remaining potential syncword 62 is valid, the No branch of decisional step 308 returns to step 302 to continue searching for potential syncwords 54. However, if decoder 30 has verified a syncword, the Yes branch of decisional step 308 leads to step 310 where decoder 30 decodes the data file 22 based on the valid syncword using conventional decoding techniques.

Figure 4:
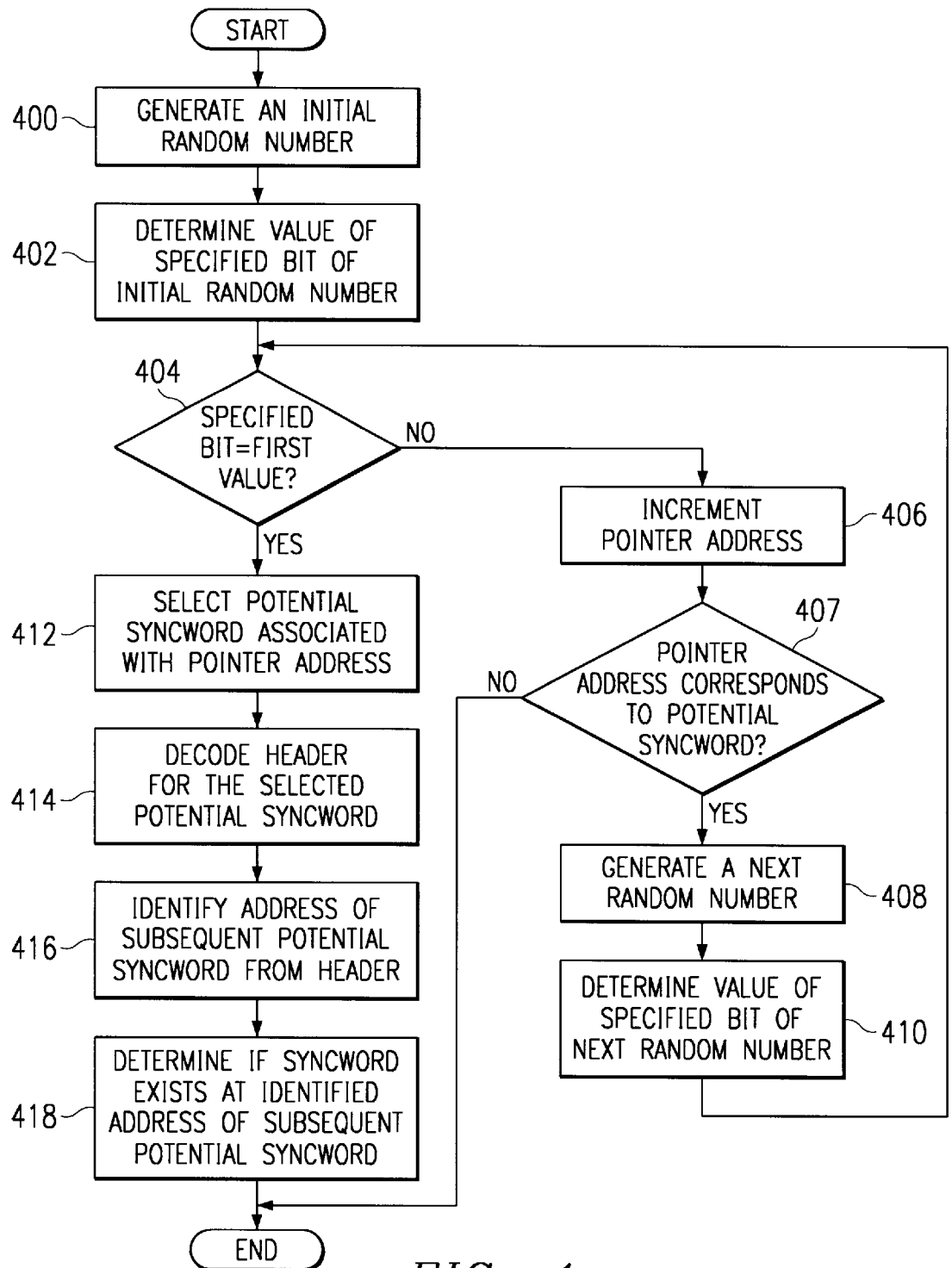
FIG. 4 is a flowchart illustrating a method for verifying a syncword in accordance with one embodiment of the present invention.

FIG. 4 is a flowchart illustrating one method by which syncword verification engine, 36 of decoder 30 may verify a syncword. Generally described, in steps 400–412, syncword verification engine 36 randomly selects one of the remaining potential syncwords 62. In steps 414–418, syncword verification engine 36 attempts to verify the randomly selected remaining potential syncword 62 by determining if a corresponding subsequent potential syncword exists at the expected location in the data file 22. It should be understood that, although the selection of the remaining potential syncword 62 is described in one embodiment as being made randomly, the selection may be made based upon a statistical distribution or any other suitable criteria.

In accordance with one embodiment of the present invention, the verification method begins at step 400 in which random number generator 38 generates an initial random number. At step 402, syncword verification engine 36 determines the value of a specified bit of the initial random number. For example, this specified bit may be the most significant bit, the least significant bit, or any other predetermined bit.

Next, at decisional step 404, the value of the specified bit is compared to a first value. If the value of the specified bit is different from the first value, a potential syncword 54 will not be selected for decoding based on the current pointer address and the No branch of decisional step 404 leads to step 406 in which the pointer address is incremented. At step 407, syncword verification engine 36 determines whether the pointer address corresponds to a potential syncword 54. If the pointer address does not correspond to any of the potential syncwords 54, all of the potential syncwords 54 have been passed and the No branch of decisional step 407 leads to the end of the process without verifying a syncword. However, if the pointer address does correspond to a potential syncword 54, the Yes branch of decisional step 407 leads to step 408, where a next random number is generated. This next random number may be generated by random number generator 38. Alternatively, this next random number may be generated by shifting the initial random number. The initial random number may be shifted left or right by any number of bits. For example, according to one embodiment, the next random number is generated by shifting the initial random number to the left by one bit. Once a next random number has been generated, the method proceeds to step 410.

At step 410, syncword verification engine 36 determines the value of the specified bit of the next random number. Step 410 returns to decisional step 404, where the value of the specified bit is compared to the first value and steps 406–410 are repeated until the specified bit matches the first value. If the value of the specified bit is the same as the first value, the Yes branch of decisional step 404 leads to step 412. At step 412, the potential syncword 54 associated with the pointer address is selected by syncword verification engine 36.

Next, at step 414, syncword verification engine 36 decodes the header associated with the selected potential syncword 54 to determine the frame length. In step 416, syncword verification engine 36 identifies the address of the subsequent potential syncword corresponding to the selected potential syncword 54 by adding the frame length to the pointer address. In step 418, syncword verification engine 36 locates the identified address in the data file 22 and determines whether a syncword exists at that location. If a syncword exists at this location, that syncword is determined to be valid and then compressed file 22 is decoded using the valid syncword.

Therefore, once the address of the subsequent potential syncword is identified, syncword verification engine 36 only needs to compare the data at that address to the syncword in order to verify the validity of the subsequent potential syncword. Accordingly, syncword verification engine does not need to store large sections of the data file 22 to verify a potential syncword 54, and reliance on a more costly, extended buffer is avoided.

If no syncword had been found by syncword verification engine 36 at the identified address in step 418 or if the pointer address had passed all of the potential syncwords 54 in step 407, decoder 30 will continue searching the data file 22 for potential syncwords 54 and passing them to the syncword verification engine 36 for verification.

In an alternative embodiment, if syncword verification engine 36 determines that a syncword exists at the identified address in step 418, the method may return to step 414. Syncword verification engine 36 would then decode the header for the subsequent potential syncword in step 414, identify the address of another subsequent potential syncword in step 416, and determine whether a syncword exists at the identified address in step 418. After verifying the existence of any specified number of syncwords in this manner, it may be determined that the syncword is valid. This embodiment requires additional processing and leads to additional delays, but provides improved accuracy.

In either of these embodiments, probabilities are assigned to each of the remaining potential syncwords 62, of which one is selected according to the probabilities. For example, the first remaining potential syncword 62 may be assigned a probability of ½, the second ¼, and so on. The probability that is left after each remaining potential syncword 62 has been assigned a probability may be assigned to the probability that none of the remaining potential syncwords 62 is valid. Thus, if there are three remaining potential syncwords 62, the probabilities of validity could be assigned as follows: first syncword,½; second syncword, ¼; third syncword, ⅛; no valid syncword, ⅛.

As previously described, this type of probability assignment may be accomplished by selecting a random number. The original pointer address for this embodiment corresponds to the beginning of the first remaining potential syncword 62. Syncword verification engine 36 then determines whether the most significant bit (MSB) of the random number is a one (1). If the MSB is a one (1), the remaining potential syncword 62 associated with the current pointer address is selected as the syncword to be decoded. However, if the MSB is a zero (0), the random number is shifted to the left by one bit, the pointer address is incremented to correspond to the beginning of the next remaining potential syncword 62, and syncword verification engine 36 repeats the process by determining the MSB of the shifted random number. Thus, using this method, each remaining potential syncword 62 has a probability of being selected that is ½ of the probability for the previous remaining potential syncword 62, with the first remaining potential syncword 62 having a probability of being selected of ½. If syncword verification engine 36 reaches the last remaining potential syncword 62 and the MSB of the random number is still a zero (0), syncword verification engine 36 may begin a new search for another potential syncword 54. Alternatively, the same result may be accomplished by modifying this embodiment to select a remaining potential syncword 62 if the MSB of the random number is a zero (0) instead of a one (1).

Figure 5:
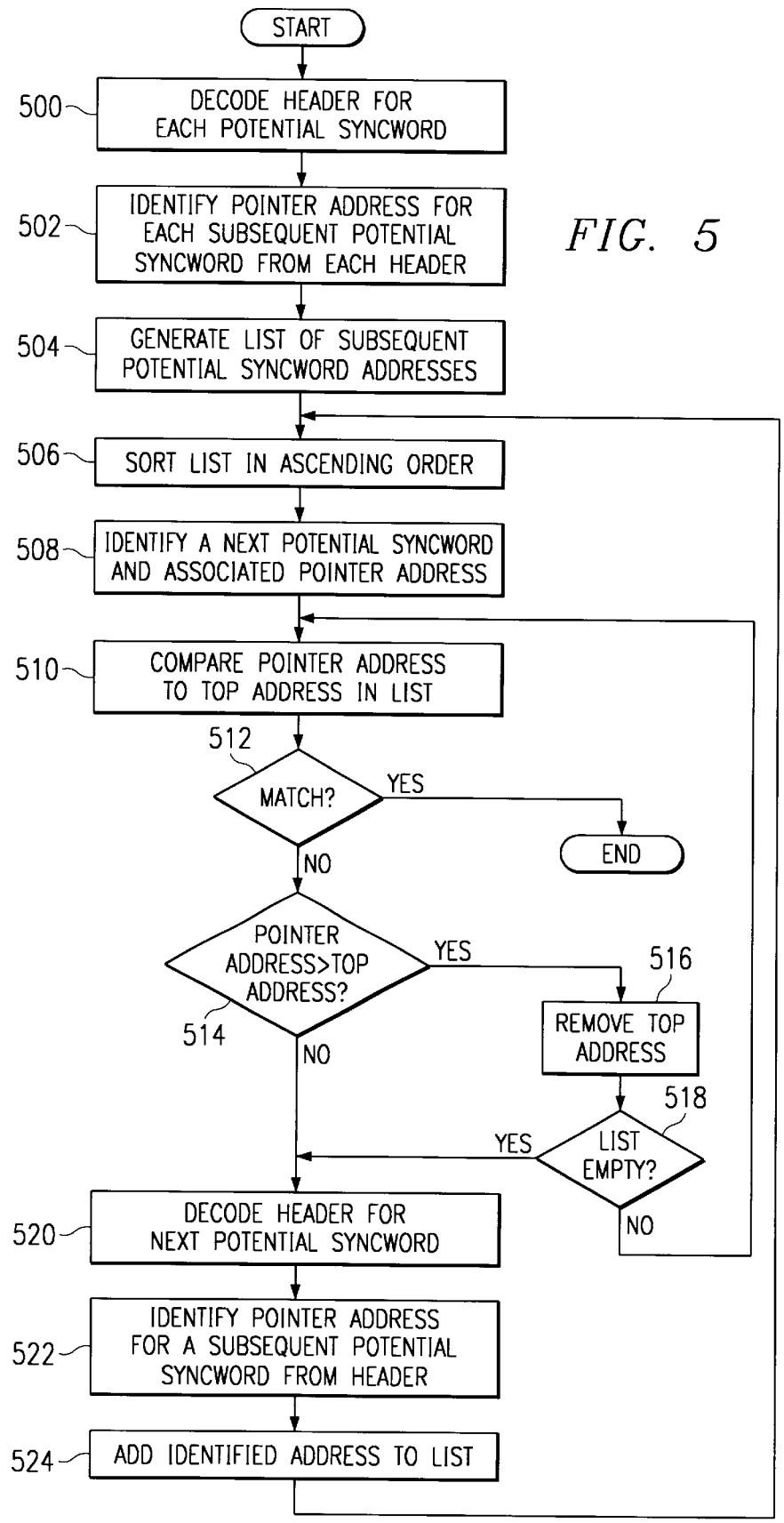
FIG. 5 is a flowchart illustrating a method for verifying a syncword in accordance with another embodiment of the present invention.

FIG. 5 is a flowchart illustrating an alternative method by which syncword verification engine 36 of decoder 30 may verify a syncword. Generally described, in steps 500–506, syncword verification engine 36 generates a list 40 of subsequent potential syncword addresses. After identifying a next potential syncword with an associated pointer address in step 508, syncword verification engine 36 attempts to verify the next potential syncword by comparing the pointer address to the addresses in the list 40 in steps 510–518. If the next potential syncword is not verified through a match between the pointer address and an address in the list 40, syncword verification engine 36 updates the list 40 by adding another subsequent potential syncword address in steps 520–524 before returning to step 506.

Referring to FIG. 5, the verification method begins at step 500 in which syncword verification engine 36 decodes the headers associated with each of the remaining potential syncwords 62 to determine the frame lengths. Next, at step 502, syncword verification engine 36 identifies a pointer address for each subsequent potential syncword by adding the frame lengths to the pointer addresses. Proceeding to step 504, syncword verification engine 36 generates a list 40 of subsequent potential syncword addresses as identified in step 502. In step 506, the list 40 is sorted in ascending order, with the smallest address on the top of the list 40 and the largest address on the bottom of the list 40. The smallest address is the address that is first encountered when searching through the data file 22 from beginning to end, and the largest address is the last address encountered.

Proceeding to step 508, a next potential syncword with an associated pointer address is identified. In step 510, syncword verification engine 36 compares this pointer address to the top address in the list 40 of subsequent potential syncword addresses. At decisional step 512, syncword verification engine 36 determines whether there is a match between the pointer address and the top address in the list 40. If there is a match, the Yes branch of decisional step 512 leads to the end of the process. In this situation, the next potential syncword has been verified. However, if there is no match, the No branch of decisional step 512 leads to decisional step 514. At step 514, syncword verification engine 36 determines whether the pointer address is greater than the top address in the list 40. If the pointer address is greater than the top address, the method follows the Yes branch to step 516 where syncword verification engine 36 removes the top address from the list 40. The method then proceeds to decisional step 518, where syncword verification engine 36 determines whether all entries have been removed from the list 40, leaving the list 40 empty. If there are still entries in the list 40, the method follows the No branch back to step 510 where the pointer address is compared to the new top address in the list 40. This loop continues until syncword verification engine 36 finds a match between the pointer address and the top address in the list 40 in step 512, in which case the syncword is verified, the pointer address is less than the top address in the list 40, in which case the method follows the No branch from decisional step 514 to arrive at step 520, or the list 40 is determined to be empty, in which case the Yes branch from decisional step 518 leads to step 520.

At step 520, syncword verification engine 36 decodes the header for the next potential syncword in order to find the frame length. In step 522, the pointer address for a subsequent potential syncword is identified by adding the frame length to the pointer address of the next potential syncword. In step 524, this identified address is added to the list 40 of subsequent potential syncword addresses. The method then returns to step 506, where the list 40 is again sorted in ascending order. At this point, another potential syncword is identified in step 508 and the method continues as before until a match is found at decisional step 512, indicating that a syncword has been verified. Accordingly, syncwords are verified by storing only a list 40 of addresses in the buffer. Thus, reliance on a more costly, extended buffer is avoided.

In an alternative embodiment, the list 40 may be sorted in descending order in step 506 and the pointer address may be compared to the bottom address in the list 40 in step 510. In this embodiment, the bottom address would be removed from the list 40 in step 516.

Although the present invention has been described with several embodiments, various changes and modifications may be suggested to one skilled in the art. It is intended that the present invention encompass such changes and modifications as fall within the scope of the appended claims.

What is claimed is:

1. A method for decoding a compressed data file, comprising:
   receiving a data file having a plurality of frames, each frame having a syncword located at a first predefined length from a known data value, the known data value inconsistent with a data pattern of the syncword;
   identifying in the data file a data string including a plurality of potential syncwords;
   skipping from syncword verification a first portion of the data string in excess of a second predefined length, the second predefined length comprising the first predefined length plus the length of the syncword; and
   processing a second remaining portion of the data string for syncword verification.

2. The method of claim 1, wherein the known data value includes a plurality of bits and the second predefined length further comprises the length of the known data value minus one bit.

3. The method of claim 1, wherein the known data value follows the syncword.

4. The method of claim 1, wherein the data file comprises an audio data file compressed using a standard selected from the group consisting of MPEG-1 and MPEG-2 and wherein the syncword comprises twelve consecutive ones (1s).

5. The method of claim 4, wherein the first predefined length is seven bits and the second predefined length is nineteen bits.

6. The method of claim 4, wherein the data file is a layer-two data file and wherein the first predefined length is two bits and the second predefined length is fourteen bits.

7. The method of claim 1, the act of processing the second remaining portion of the data string for syncword verification comprising:

randomly selecting one of the potential syncwords from the second remaining portion of the data string;

determining a subsequent potential syncword address based on the selected potential syncword;

determining if a subsequent potential syncword exists at the subsequent potential syncword address; and decoding the data file based on the subsequent potential syncword in response to the subsequent potential syncword existing at the subsequent potential syncword address.

8. The method of claim 7, the act of randomly selecting one of the potential syncwords comprising:

generating a random number;

determining the value of a specified bit of the random number;

determining a pointer address based on the specified bit of the random number; and selecting from the second remaining portion of the data string the potential syncword associated with the pointer address.

9. The method of claim 7, the act of randomly selecting one of the potential syncwords comprising:

generating an initial random number;

determining the value of a specified bit of the initial random number;

in response to the specified bit of the initial random number being a first value, selecting from the second remaining portion of the data string the potential syncword associated with a pointer address; and in response to the specified bit of the initial random number being a second value, generating a next random number, incrementing the pointer address to be associated with a next potential syncword in the second remaining portion of the data string, and determining the value of the specified bit of the next random number until the specified bit of the next random number is the first value, then selecting from the second remaining portion of the data string the potential syncword associated with the pointer address.

10. The method of claim 7, the act of determining a subsequent potential syncword address comprising:

decoding a header associated with the selected potential syncword;

determining a frame length based on the header; and determining the subsequent potential syncword address based on the frame length.

11. The method of claim 1, the act of processing the second remaining portion of the data string for syncword verification comprising:

selecting one of the potential syncwords from the second remaining portion of the data string according to a statistical distribution;

determining a subsequent potential syncword address based on the selected potential syncword;

determining if a subsequent potential syncword exists at the subsequent potential syncword address; and decoding the data file based on the subsequent potential syncword in response to the subsequent potential syncword existing at the subsequent potential syncword address.

12. The method of claim 1, the act of processing the second remaining portion of the data string for syncword verification comprising:

determining a subsequent potential syncword address for each potential syncword in the second remaining portion of the data string;

identifying a pointer address corresponding to a potential syncword following the data string in the data file;

comparing the pointer address to the subsequent potential syncword addresses; and decoding the data file based on the potential syncword following the data string in response to the pointer address corresponding to one of the subsequent potential syncword addresses.

13. The method of claim 12, the act of determining a subsequent potential syncword address for each potential syncword comprising:

decoding a header associated with each potential syncword;

determining a frame length based on the header; and determining the subsequent potential syncword address based on the frame length.

14. The method of claim 12, wherein the subsequent potential syncword addresses are stored in a list and further comprising, in response to the pointer address not corresponding to one of the subsequent potential syncword addresses in the list:

updating the list by removing any subsequent potential syncword address less than the pointer address and adding a subsequent potential syncword address for the potential syncword following the data string;

identifying a next pointer address corresponding to a next potential syncword following the data string;

comparing the next pointer address to the subsequent potential syncword addresses in the list; and updating the list by removing any subsequent potential syncword address less than the next pointer address and adding a subsequent potential syncword address for the next potential syncword until the next pointer address corresponds to a subsequent potential syncword address in the list, then decoding the data file based on the next potential syncword.

15. The method of claim 12, the act of identifying a pointer address corresponding to a potential syncword following the data string comprising:

identifying in the data file a second data string including a plurality of potential syncwords;

skipping from syncword verification a first portion of the second data string in excess of the second predefined length; and identifying in a second remaining portion of the second data string a pointer address corresponding to a potential syncword.

16. A system for decoding a compressed data file, comprising:

a data file having a plurality of frames, each frame having a syncword located at a first predefined length from a known data value, the known data value inconsistent with a data pattern of the syncword;

a syncword search engine operable to identify a data string in the data file including a plurality of potential syncwords and to skip from syncword verification a first portion of the data string in excess of a second predefined length;

a syncword verification engine operable to determine if at least one of the potential syncwords in a second remaining portion of the data string is a valid syncword; and a decoder operable to decode the data file based on the valid syncword.

17. The system of claim 16, further comprising a random number generator operable to generate a random number and wherein the syncword verification engine is further operable to:

randomly select one of the potential syncwords in the second remaining portion of the data string based on the random number generated by the random number generator;

determine a subsequent potential syncword address based on the selected potential syncword; and determine that the selected potential syncword is valid in response to a subsequent potential syncword existing at the subsequent potential syncword address.

18. The system of claim 16, wherein the syncword verification engine is further operable to:

select one of the potential syncwords in the second remaining portion of the data string according to a statistical distribution;

determine a subsequent potential syncword address based on the selected potential syncword; and determine that the selected potential syncword is valid in response to a subsequent potential syncword existing at the subsequent potential syncword address.

19. The system of claim 16, wherein the syncword verification engine is further operable to:

determine a subsequent potential syncword address for is each potential syncword in the second remaining portion of the data string;

identify a pointer address corresponding to a subsequent potential syncword;

compare the pointer address to the subsequent potential syncword addresses; and determine that the subsequent potential syncword is a valid syncword in response to the pointer address corresponding to one of the subsequent potential syncword addresses.

20. The system of claim 19, further comprising a list including the subsequent potential syncword addresses.

* * * * *